(12) United States Patent
Niwa et al.

(10) Patent No.: US 8,253,020 B2
(45) Date of Patent: Aug. 28, 2012

(54) BUS-BAR CONNECTION STRUCTURE AND INVERTER-INTEGRATED ELECTRIC COMPRESSOR

(75) Inventors: Kazuki Niwa, Aichi-ken (JP); Makoto Hattori, Aichi-ken (JP); Takayuki Takashige, Aichi-ken (JP); Atsushi Takai, Aichi-ken (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 656 days.

(21) Appl. No.: 11/989,862

(22) PCT Filed: Jan. 18, 2008

(86) PCT No.: PCT/JP2008/050576
§ 371 (c)(1),
(2), (4) Date: Jan. 8, 2009

(87) PCT Pub. No.: WO2008/093544
PCT Pub. Date: Aug. 7, 2008

(65) Prior Publication Data
US 2009/0255704 A1    Oct. 15, 2009

(30) Foreign Application Priority Data

Feb. 1, 2007   (JP) ................................. 2007-022744

(51) Int. Cl.
*H02G 5/00*   (2006.01)
(52) U.S. Cl. .................. 174/68.2; 174/70 B; 174/88 B; 174/133 B; 439/891
(58) Field of Classification Search ............... 174/68.2, 174/88 B, 70 B, 133 B; 439/891
See application file for complete search history.

(56) References Cited

U.S. PATENT DOCUMENTS

| 5,338,992 A | 8/1994 | Tsai | |
| 5,951,340 A * | 9/1999 | Mueller et al. | 439/891 |
| 7,207,187 B2 * | 4/2007 | Funahashi et al. | 62/228.4 |

(Continued)

FOREIGN PATENT DOCUMENTS

| DE | 203 20 643 U1 | 1/2005 |
| JP | 46-11160 Y1 | 4/1971 |

(Continued)

OTHER PUBLICATIONS

International Search Report of PCT/JP2008/050576, date of mailing date Feb. 26, 2008.

(Continued)

*Primary Examiner* — Dhirubhai R Patel
(74) *Attorney, Agent, or Firm* — Westerman, Hattori, Daniels & Adrian, LLP

(57) ABSTRACT

An object of the present invention is to facilitate welding connection of an enameled wire to a busbar to increase accuracy and reliability of the welding, and inverter-integrated electric compressor by reducing processes of welding operation. In a busbar connection structure for closely contacting, welding and connecting an enameled wire end portion (27A, 28A) of a coil onto an external connection bent surface (35) formed on a busbar (33), a through hole (36, 46) through which the end portion (27A, 28A) of the enameled wire (27, 28) passes is formed on the inside of a base portion of the bent surface (35) of the busbar (33), and the end portion (27A, 28A) of the enameled wire (27, 28) is passed through the through hole (36, 46), positioned onto a welding point (35A) of the bent surface (35), and welded and connected onto the bent surface (35).

4 Claims, 4 Drawing Sheets

U.S. PATENT DOCUMENTS

2003/0200761 A1 * 10/2003 Funahashi et al. ........... 62/228.4
2006/0086900 A1     4/2006 Nakamura

FOREIGN PATENT DOCUMENTS

| | | |
|---|---|---|
| JP | 6-45258 U | 6/1994 |
| JP | 11-220823 A | 8/1999 |
| JP | 2003-324903 A | 11/2003 |
| JP | 2004-190547 A | 7/2004 |
| JP | 2004-225580 A | 8/2004 |

OTHER PUBLICATIONS

Chinese Office Action dated Nov. 2, 2010, issued in corresponding Chinese Patent Application No. 200880000462.6.

Japanese Office Action dated Nov. 1, 2011, issued in corresponding Japanese Patent Application No. 2007-022744.

Supplementary European Search Report dated Jun. 14, 2012, issued in corresponding European Patent Application No. 08703426.0.

* cited by examiner

BUS-BAR CONNECTION STRUCTURE AND INVERTER-INTEGRATED ELECTRIC COMPRESSOR

TECHNICAL FIELD

The present invention relates to a busbar connection structure for connecting an end portion of an enameled wire to a busbar by welding, and an inverter-integrated electric compressor using the busbar connection structure.

BACKGROUND ART

In recent years, as compressors applied to air conditioners for vehicle, inverter-integrated electric compressors have come in practical use. The inverter-integrated electric compressor has an inverter housing portion on a periphery of a housing of the electric compressor, and in the inverter housing portion, an inverter device that converts a direct current power into a three-phase alternating-current power and supplies the power to an electric motor is installed.

The inverter-integrated electric compressors use, for wiring connection of the inverter devices, busbar assemblies formed by integrating busbars by insert resin formation using resins that are insulation materials (for example, see Patent document 1).

Further, to the busbar assemblies, coils (inductors, capacitors, or the like) are connected to remove electric noise.

Normally, for the connection of a busbar to an enameled wire of a coil, (1) a method of providing a terminal having a circular hole and fixing an enameled wire using a screw and a nut, (2) a method of welding a busbar and an enameled wire by micro resistance welding or the like have been used. In view of reliability and production process reduction, the method (2), that is, the micro resistance welding is considered advantageous.

In Patent document 2, as a busbar structure for an electric connection box, a busbar structure for laser welding a busbar and a jumper wire is disclosed. In the structure, to connect both ends of a covered electric wire forming a jumper wire to a predetermined pattern sections of the busbar, insertion holes into which core wire end portions of the jumper wire are inserted are provided to the predetermined pattern sections, or flat planes that contact with the busbar are formed on the periphery of core wire end portions.

[Patent document 1] Japanese Unexamined Patent Application, Publication No. 2004-190547

[Patent document 2] Japanese Unexamined Patent Application, Publication No. Hei11-220823

DISCLOSURE OF INVENTION

To micro-resistance-weld an enameled wire end portion of a coil to a flat bent surface for external connection of a busbar, it is necessary to contact, fix, and weld the round bar-shaped enameled wire end portion to the plane bent surface in the air.

However, it is difficult to fix the enameled wire end portion that extends from the coil in the air, and the enameled wire end portion hangs down. Accordingly, it is difficult to accurately position and closely contact the enameled wire end portion with a welding point of the bent surface, and the accuracy and reliability of the welding may be decreased. To solve the problem, welding jigs for fixing the enameled wire end portion may be used. However, the use of the jigs increase welding processes, and may decrease the productivity. Accordingly, it is not preferable to use the jigs. The technique disclosed in Patent document 2 also requires, in the welding process, the jumper wire process and the holding and fixing means for the jumper wire.

The present invention has been made in view of the above, and an object of the present invention is to facilitate welding connection of an enameled wire to a busbar to increase the accuracy and reliability of the welding, and provide a high-quality and highly reliable busbar connection structure and inverter-integrated electric compressor by reducing the processes of welding operation.

In order to solve the above problems, the busbar connection structure and the inverter-integrated electric compressor according to the present invention employ the following solutions.

That is, according to a first aspect of the present invention, in a busbar connection structure for closely contacting, welding and connecting an enameled wire end portion of a coil onto an external connection bent surface formed on a busbar, a through hole through which the end portion of the enameled wire passes is formed on the inside of a base portion of the bent surface of the busbar, and the end portion of the enameled wire is passed through the through hole, positioned onto a welding point of the bent surface, and welded and connected onto the bent surface.

According to the first aspect of the present invention, in the welding connection of the end portion of the enameled wire to the bent surface formed on the busbar, the end portion of the enameled wire is passed through the through hole formed on the inside of the base portion of the bent surface, the end portion of the enameled wire is closely contacted and positioned onto the welding point of the bent surface. In this state, the end portion of the enameled wire can be welded and connected onto the bent surface. Accordingly, it is possible to readily position the enameled wire end portion in the welding, and the accuracy and reliability of the welding can be increased, and the production process of the welding can be reduced. Accordingly, with respect to the busbar connection structure, the productivity and the product quality can be increased, and the cost can be reduced.

Further, according to a second aspect of the present invention, in the above-described busbar connection structure, a pair of the bent surfaces is provided to the busbar to weld and connect both end portions of the enameled wire of the coil, and the pair of the bent surfaces is provided to face a same direction.

According to the second aspect of the present invention, the pair of the bent surfaces for welding and connecting the both ends of the enameled wire of the coil faces the same direction. Accordingly, a structure of a welding machine side can be simplified. Further, if the welding machine is moved, the movement can be simplified. Accordingly, the efficiency in the welding operation can be increased and the productivity cab be improved.

Further, according to a third aspect of the present invention, in any one of the above-described busbar connection structures, a plurality of coils are connected to the busbar, a plurality of the pair of the bent surfaces for welding and connecting the both end portions of the enameled wires of the coils is provided at a plurality of positions on the busbar, and the pairs of the bent surfaces provided at the plurality of positions face the same direction.

According to the third aspect of the present invention, the bent surfaces to which the enameled wires of the plurality of the coils are welded and connected are provided at the plurality of points on the busbar, and all of the bent surfaces face the same direction. Accordingly, the end portions of the enameled wires can be welded onto the pairs of the bent surfaces provided at the plurality of positions by simply moving the welding machine to an X-Y direction. Accordingly, the time necessary for the welding can be reduced as much as possible to increase the efficiency in the welding operation, and the productivity can be improved.

Further, according to a fourth aspect of the present invention, in any one of the above-described busbar connection structures, the through hole has a shape formed to have a large diameter at a part away from the bent surface and taper the hole gradually to the base portion of the bent surface.

According to the fourth aspect of the present invention, the through hole has the shape formed to have the large diameter at the part away from the bent surface and taper the hole gradually to the base portion of the bent surface. Accordingly, the pass-through operation of the enameled wire end portion can be readily performed using the large diameter portion. Further, by moving the enameled wire to the tapered portion side, the accuracy in the positioning to the welding point can be ensured. Accordingly, the welding operation can be simplified and the productivity can be improved. Further, the accuracy and reliability in the welding can be ensured.

Further, according to a fifth aspect of the present invention, an inverter-integrated electric compressor includes an inverter housing portion provided on a periphery of a housing that accommodates an electric compressor. An inverter device is installed in the inverter housing portion, the inverter device which converts a direct current power into a three-phase alternating current power and supplies the power to an electric motor. The inverter device includes a busbar assembly formed by integrating a plurality of busbars that function as wirings of the inverter device using an insulating material, and at least one coil that is welded and connected to the busbar. A welding structure of the busbar and an enameled wire of the coil is the busbar connection structure according to any one of the above-described busbar connection structures.

According to the fifth aspect of the present invention, the welding structure of the busbar of the busbar assembly that functions as the wirings of the inverter device provided in the installation of the inverter device and at least one coil is the busbar connection structure according to any one of the first to fourth aspects of the present invention. Accordingly, the accuracy and reliability in the welding of the busbar and the enameled wire end portion can be increased. Further, the productivity can be increased by the reduction in the welding process and the increased operation efficiency. Accordingly, the high quality and highly reliable inverter-integrated electric compressor can be manufactured at low cost.

According to the busbar connection structures of the present invention, in the welding, the positioning of the enameled wire end portion of the coil with respect to the bent surface for external connection of the busbar can be facilitated, and the accuracy and reliability in the welding can be increased. Further, since the welding process can be reduced, the productivity and the product quality can be increased and the cost can be reduced.

EXPLANATION OF REFERENCE SIGNS

Figure 1:
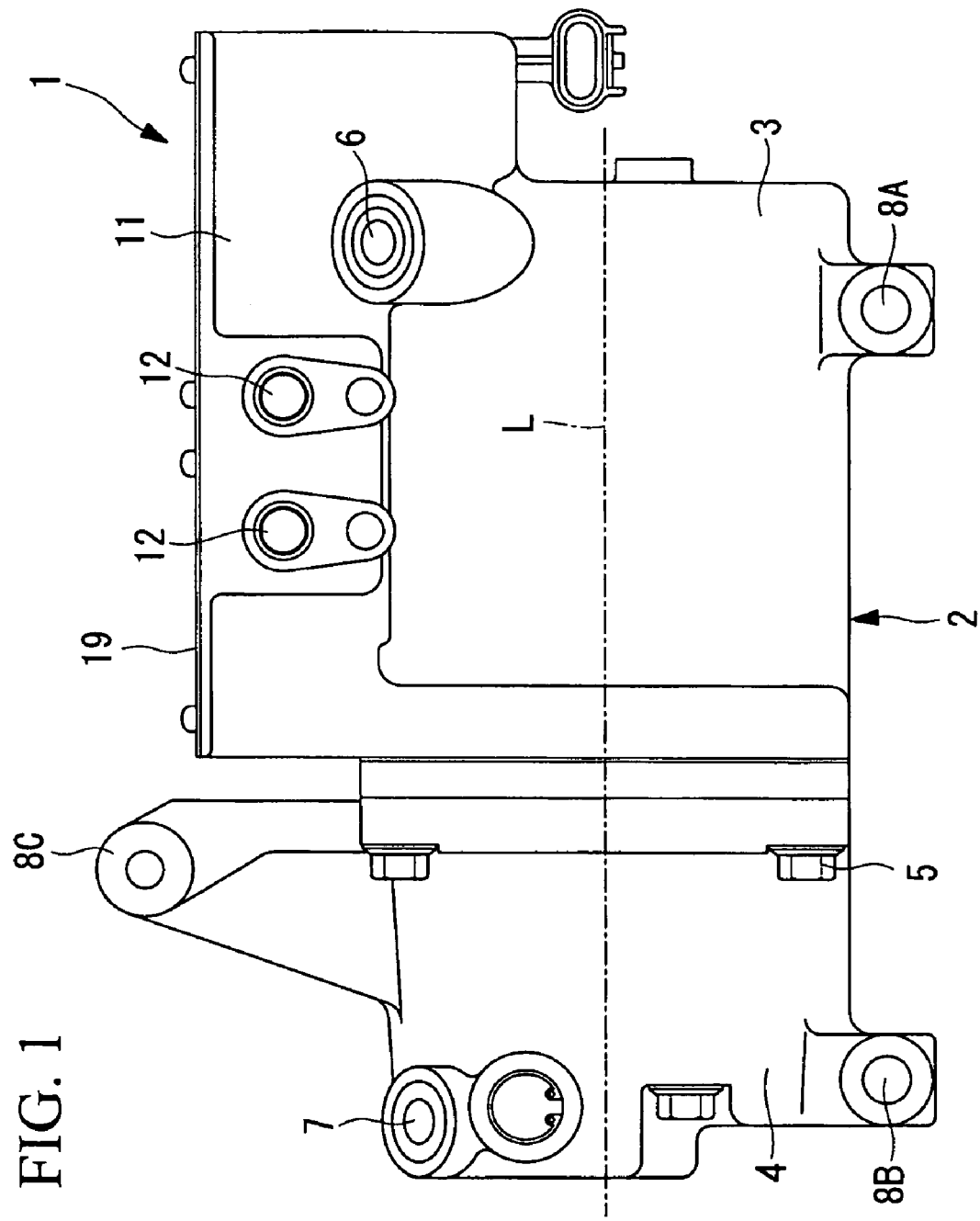
FIG. 1 is an external side view illustrating an inverter-integrated electric compressor according to a first embodiment of the present invention.

1: inverter-integrated electric compressor
2: housing
11: inverter housing portion
17: inductor (coil)
18: inverter device
23: busbar assembly
26: capacitor (coil)
27, 28: enameled wire
27A, 28A: enameled wire end portion
33: busbar
34: external connection portion
35: bent surface
35A: welding point
36, 46: through hole

BEST MODE FOR CARRYING OUT THE INVENTION

Hereinafter, embodiments of the present invention will be described with reference to the drawings.

First Embodiment

Hereinafter, a first embodiment of the present invention will be described with reference to FIG. 1 to FIG. 4.

FIG. 1 is an external side view illustrating an inverter-integrated electric compressor 1 according to the first embodiment of the present invention. The inverter-integrated electric compressor 1 includes a housing 2 that forms an outer shell of the inverter-integrated electric compressor 1. The housing 2 includes a motor housing 3 that accommodates an electric motor (not shown) and a compressor housing 4 that accommodates a compressor (not shown). The motor housing 3 and the compressor housing 4 are integrally fastened and fixed through a bolt 5. The motor housing 3 and the compressor housing 4 are formed by aluminum die-casting.

The electric motor (not shown) and the compressor (not shown) accommodated and installed in the motor housing 3 and the compressor housing 4 are connected with each other through a motor shaft. The compressor is driven by rotation of the electric motor. At a rear end side (right side in FIG. 1) of the motor housing 3, an inlet port 6 is provided. Low-pressure refrigerant gas introduced from the inlet port 6 into the motor housing 3 passes through around the electric motor, and sucked and compressed by the compressor. The high-temperature and high-pressure refrigerant gas compressed by the compressor is discharged into the compressor housing 4, and discharged to outside from an outlet port 7 provided at a front end side (left side in FIG. 1) of the compressor housing 4.

The housing 2 includes mounting feet 8A, 8B, and 8C provided at three points in total, that is, at a lower part of the rear end side (right side in FIG. 1) of the motor housing 3, a lower part of the front end side (left side in FIG. 1) of the compressor housing 4, and an upper side of the compressor housing 4. With mounting feet 8A, 8B, and 8C, the inverter-integrated electric compressor 1 is mounted on vehicles by fixing and installing on a cantilever bracket installed on a side wall of a motor for vehicle traveling or the like (not shown) by a bolt or the like.

Figure 2:
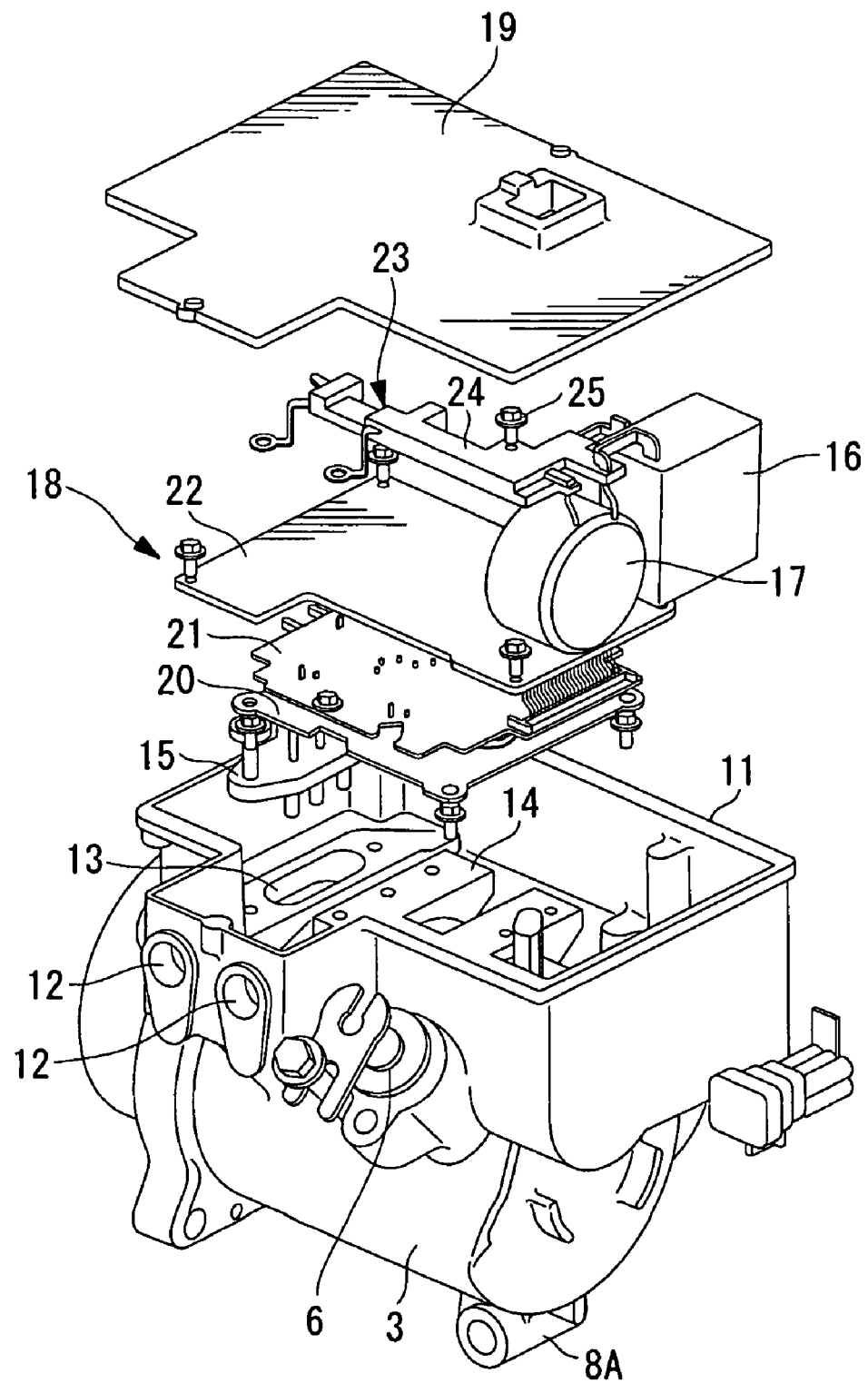
FIG. 2 is an exploded perspective view illustrating the inverter-integrated electric compressor shown in FIG. 1.

Further, on upper part of the periphery of the motor housing 3, a box-shaped inverter housing portion 11 is integrally formed. As shown in FIG. 2, the inverter housing portion 11 has a box structure that the upper surface is opened and surrounded by a wall having a predetermined height. On a side surface of the inverter housing portion 11, two power cable outlet ports 12 are provided. In the inverter housing portion 11, a motor terminal mounting hole 13 and a metal plate radiation surface 14 are provided. Further, a direct current power P-N terminal that is connected with a power cable (not shown), a metal plate installation boss portion, a CPU board installation boss portion, and the like are provided. The inverter housing portion 11 houses a motor terminal 15 that is to be mounted on the motor terminal mounting hole 13, a head condenser 16, an inductor 17, an inverter device 18, and the like. The upper surface of the inverter housing portion 11 is covered with a lid member 19 by screwing the lid member 19.

As shown in FIG. 2, the inverter device 18 includes a metal plate 20, a power board 21, a CPU board 22, and a busbar assembly 23. The metal plate 20 is made of an aluminum alloy, and fixed and installed in boss portions or the like at four corners so that the metal plate 20 contacts with the radiation surface 14 of the inverter housing portion 11 to function as a heat sink. The power board 21 includes a power system control circuit that operates a semiconductor switching device for power (insulated gate bipolar transistor, hereinafter, referred to as IGBT) (not shown) that is installed on the metal plate 20, and installed on boss parts on the metal plate 20. The CPU board 22 includes a circuit that has an element that operates at low voltage of a CPU or the like and is fixed and installed in boss portions or the like at four corners. The busbar assembly 23 includes busbars that function as wirings for the inverter device 18 and the busbars are integrally formed by insert forming using a resin of an insulating material.

The busbar assembly 23 is formed as a component such that the plurality of busbars such as a P-N busbar that connects the IGBT (not shown) with a direct current power P-N terminal, a U-V-W busbar that connects the IGBT with the motor terminal 15 are integrally formed using an insert resin 24. The busbar assembly 23 is formed to have an L-shape to be opposite to the direct current power P-N terminal and the motor terminal 15, and integrally fixed onto the power board 21 using a screw 25 along adjacent two sides of the power board 21.

The busbar assembly 23 functions as the power supply line as described above and a busbar 33 functions as a ground line of the busbar assembly 23. In the busbar 33, as shown in FIG. 3, to remove electric noise, both ends of enameled wires 27 and 28 of the coils such as the inductor 17, the capacitor 26, and the like are welded and connected by micro resistance welding or the like.

Figure 4:
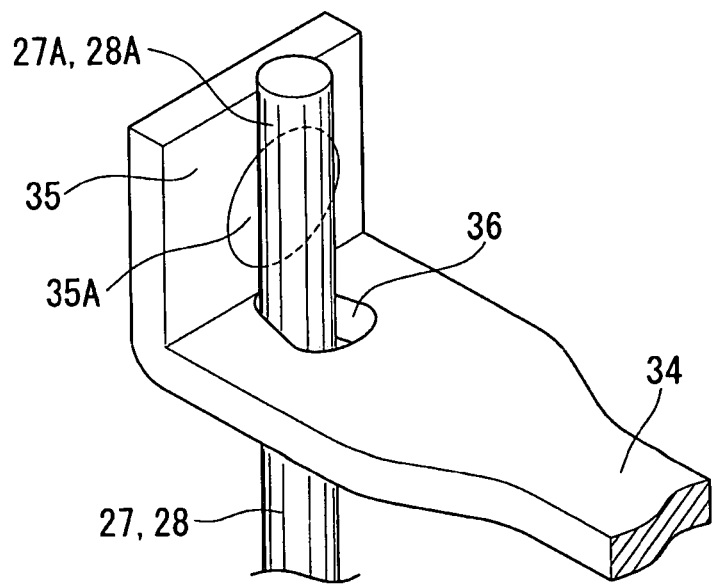
FIG. 4 is a partially enlarged perspective view illustrating a connection portion of a busbar and an enameled wire of a coil shown in FIG. 3.

To end portions of external connection portions 34 in the busbar 33, as shown in FIG. 4, bent surfaces 35 that are bent upward are formed. At a welding point 35A on an inner surface side of the bent surface 35, an end portion 27A of the enameled wire 27 or an end portion 28A of the enameled wire 28 is positioned and welded.

On the external connection portion 34 described above, on the inside of a base of the bent surface 35, a through hole 36 through which the end portion 27A of the enameled wire 27 or the end portion 28A of the enameled wire 28 passes is provided. By passing the end portion 27A of the enameled wire 27 or the end portion 28A of the enameled wire 28 through the through hole 36, the end portion 27A or 28A of the enameled wire 28 is positioned and closely contacted with respect to the welding point 35A on the inner surface side of the bent surface 35.

Figure 3:
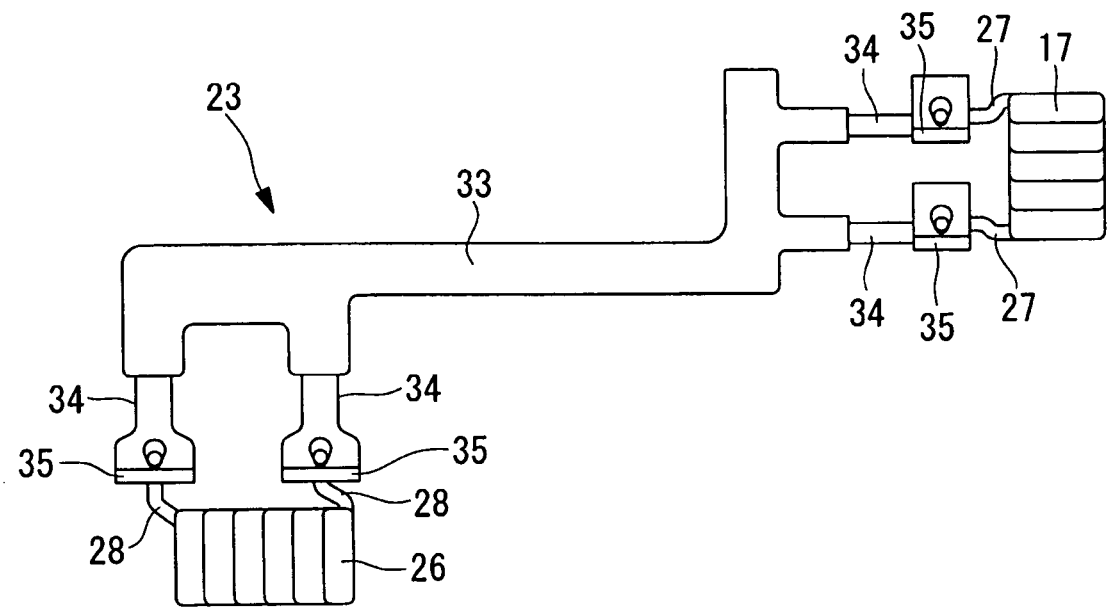
FIG. 3 is a plan view illustrating a connection portion of a busbar and an enameled wire of a coil according to the first embodiment of the present invention.

With respect to the external connection portions 34 of the busbar 33, in FIG. 3, at a right end part of the busbar 33, a pair of the external connection portions 34 for the inductor 17 is provided, and at a left end part, a pair of the external connection portions 34 for the capacitor 26 is provided. The bent surfaces 35 of the external connection portions 34 provided at the plurality of positions are positioned such that the welding surfaces, that is, the inner surfaces of the bent surfaces face the same direction (in the present embodiment, the upper side direction in FIG. 3).

By the above-described structure, according to the present embodiment, the following effects can be obtained.

In the installation of the inverter device 18 in the inverter housing portion 11, the metal plate 20 is installed and fixed onto the radiation surface 14 in a state that the IGBT (not shown), the power board 21, and the like are sub-assembled on the metal plate 20. Here, onto the power board 21, the busbar assembly 23 is integrally fixed. Onto the busbar 33 of the busbar assembly 23, the coils such as the inductor 17, the capacitor 26, and the like installed in the inverter housing portion 11 in advance are welded and connected.

In the welding connection, as shown in FIGS. 3 and 4, the end portions 27A and 28A of the enameled wires 27 and 28 that form the coils of the inductor 17, the capacitor 26, and the like are passed through the through holes 36 that are provided on the external connection portions 34 of the busbar 33. Then, the end portions 27A and 28A of the enameled wires 27 and 28 are appropriately close-contacted and positioned onto the welding points 35A of the bent surfaces 35 that are the welding surfaces. Accordingly, by moving a welding machine (not shown) in the state and welding the end portions 27A and 28A of the enameled wires 27 and 28 onto the bent surfaces 35 of the busbar 33 by micro resistance welding or the like, the enameled wires 27 and 28 of the coils can be accurately and firmly welded and connected to the predetermined welding points 35A of the busbar 33.

As described above, since it is possible to accurately and readily position the end portions 27A and 28A of the enameled wires 27 and 28 onto the predetermined welding points 35A of the busbar 33, the accuracy and reliability in the welding of the welding points and the end portions can be improved. Further, the production process of the welding can be reduced.

Accordingly, it is possible to improve the productivity and the product quality, reduce the cost, and the high-quality and highly reliable inverter-integrated electric compressor 1 can be manufactured at low cost.

Further, the pair of the bent surface 35 for welding and connecting the end portions 27A or 28A of the enameled wire 27 or 28 of one coil at the busbar 33 side, and the pairs of the bent surfaces 35 for welding and connecting the end portions 27A and 28A of the enameled wires 27 and 28 of the plurality of the coils that are provided at the plurality of positions at the busbar 33 side face the same direction. Accordingly, the structure of the welding machine side can be simplified. Further, if the welding machine is moved, only by moving the welding machine in an X-Y direction, the welding can be performed at the plurality of points, and the movement can be simplified. Accordingly, the time necessary for the welding can be reduced as much as possible, and the efficiency in the welding operation can be increased and the productivity can be improved. Further, even if it is required to position the plurality of the coils separately due to a packaging restriction, it is possible to readily deal with the problem.

Second Embodiment

Now, a second embodiment of the present invention will be described with reference to FIG. 5.

The second embodiment differs in a structure of the through hole provided in the external connection portion 34 of the busbar 33 from that in the first embodiment described above. The other structures are similar to those in the first embodiment. Accordingly, their descriptions are omitted.

Figure 5:
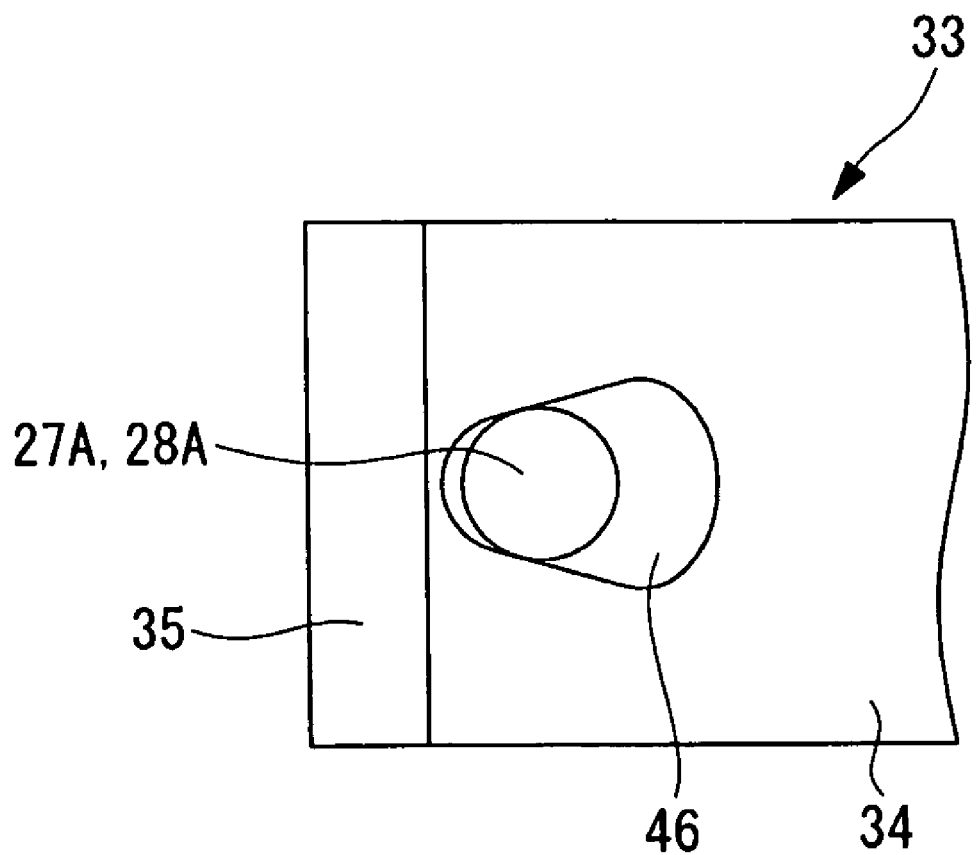
FIG. 5 is a partially enlarged plan view illustrating a connection portion of a busbar and an enameled wire of a coil according to a second embodiment of the present invention.

As shown in FIG. 5, a through hole 46 has a deformed shape to have a larger diameter at a part away from the bent surface 35. The closer to the base portion of the bent surface 35, the more the part becomes tapered.

As described above, by the formation of the through hole 46 having the large diameter at the part away from the bent surface 35 and tapering the hole gradually to the base portion of the bent surface 35, the pass-through operation can be facilitated by inserting the end portion 27A of the enameled wire 27 or the end portion 28A of the enameled wire 28 into the through hole 46 from the large-diameter portion. Further, by moving the end portion 27A of the enameled wire 27 or the end portion 28A of the enameled wire 28 passed through the through hole 46 to the tapered portion side, the positioning with respect to the welding point 35A of the bent surface 35 can be automatically performed, and the accuracy can be ensured. Accordingly, the welding operation can be further facilitated and the productivity can be improved. Further, the accuracy and reliability in the welding can be ensured.

It is to be understood that the present invention is not limited to the above-described embodiments, but various modifications can be made without departing from the spirit of the invention. For example, in the welding of the busbar 33 and the enameled wires 27 and 28, the busbar 33 is formed by plating copper with tin, and the enameled wires 27 and 28 are formed by coating copper wires with enamel. However, if the busbar 33 and the wire 27 or 28 can be welded together, the welding method is not limited to the micro resistance welding, but any welding method may be employed.

The invention claimed is:

1. A busbar connection structure for closely contacting, welding, and connecting an enameled wire end portion of a coil onto an external connection bent surface formed on a busbar,
    wherein a through hole through which the end portion of the enameled wire passes is formed on an end of an external connection portion which constitutes an inside of a base portion of the bent surface of the busbar,
    the through hole a shape formed to have a large diameter at a part away from the bent surface and to taper gradually toward the base portion of the bent surface, and
    the end portion of the enameled wire is passed through the through hole from the large diameter, positioned onto a welding point of the bent surface by moving the enameled wire to the tapered portion side, and welded and connected onto the bent surface.

2. The busbar connection structure according to claim 1, wherein a pair of the bent surfaces is provided to the busbar to weld and connect both end portions of the enameled wire of the coil, and the pair of the bent surfaces is provided to face a same direction.

3. The busbar connection structure according to claim 1, wherein a plurality of coils are connected to the busbar, a plurality of a pair of bent surfaces for welding and connecting both end portions of enameled wires of coils is provided at a plurality of positions on the busbar, and the plurality of the pair of bent surfaces provided at the plurality of positions face a same direction.

4. An inverter-integrated electric compressor comprising:
    an inverter housing portion provided on a periphery of a housing that accommodates an electric compressor, and
    an inverter device installed in the inverter housing portion, the inverter device which converts a direct current power into a three-phase alternating current power and supplies the power to an electric motor,
    wherein the inverter device includes a busbar assembly formed by integrating a plurality of busbars that function as wirings of the inverter device using an insulating material, and at least one coil that is welded and connected to the busbar, and a welding structure of the busbar and the enameled wire of the coil is the busbar connection structure according to claim 1.

* * * * *